(12) United States Patent
Perkins

(10) Patent No.: X241
(45) Date of Patent: Mar. 19, 1799

(54) COUNTERFEIT NOTES,DETECT/COUNTERFI

(76) Inventor: Jacob Perkins

United States Patent

Patent No.: X241

Jacob Perkins
Mar. 19. 1799
Detecting Counterfeit Notes see London
Journal of Arts & Sciences Vol. 1 Page 161.